United States Patent
Sakai

(10) Patent No.: US 9,522,679 B2
(45) Date of Patent: Dec. 20, 2016

(54) VEHICLE CONTROLLER

(71) Applicant: DENSO CORPORATION, Kariya, Aichi-pref. (JP)

(72) Inventor: Naoto Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 18 days.

(21) Appl. No.: 14/671,091

(22) Filed: Mar. 27, 2015

(65) Prior Publication Data

US 2015/0291148 A1 Oct. 15, 2015

(30) Foreign Application Priority Data

Apr. 11, 2014 (JP) ................................. 2014-082100

(51) Int. Cl.
*B60W 30/18* (2012.01)
*B60W 10/184* (2012.01)
(Continued)

(52) U.S. Cl.
CPC ........ *B60W 30/18127* (2013.01); *B60K 6/445* (2013.01); *B60W 10/08* (2013.01); *B60W 10/184* (2013.01); *B60W 20/14* (2016.01); *B60W 2510/082* (2013.01); *B60W 2550/147* (2013.01); *B60W 2550/148* (2013.01); *B60W 2710/083* (2013.01); *B60W 2710/182* (2013.01);
(Continued)

(58) Field of Classification Search
CPC .... B60W 20/14; B60W 10/08; B60W 10/184; B60W 30/18127; B60W 2710/182; B60W 2550/148; B60W 2710/083; B60W 2550/147; B60W 2510/082; B60K 6/445; B60Y 2300/89; Y02T 10/6239; Y02T 10/7077; Y02T 10/7275
See application file for complete search history.

(56) References Cited

U.S. PATENT DOCUMENTS 7,650,956 B2 * 1/2010 Hirata ................... B60W 10/08
180/248
8,016,367 B2 * 9/2011 Hirata ................... B60W 10/08
303/138

(Continued)

FOREIGN PATENT DOCUMENTS

JP 2000-166014 A 6/2000
JP 2008-049829 A 3/2008
JP 2011-182258 A 9/2011

*Primary Examiner* — Dale W Hilgendorf
(74) *Attorney, Agent, or Firm* — Posz Law Group, PLC

(57) ABSTRACT

A vehicle controller includes an hybrid vehicle (HV) ECU, a motor-generator (MG) ECU, a brake ECU, a first communication line that enables one-to-one connection between the HV ECU and the MG ECU, and a second communication line that enables connection among plural ECUs including the HV ECU and the brake ECU. The MG ECU calculates an operation torque of first and second MGs. The MG ECU is communicable with the brake ECU via the second communication line. In addition, the controller includes a microcomputer that serves as a travel state determiner for determining whether a travel state of a hybrid vehicle is a transition state in which a drive wheel alternatively slips and grips. Based on a determination result of the microcomputer, the controller switches to the first communication line in a normal state and to the second communication line in the transition state.

4 Claims, 8 Drawing Sheets

(51) Int. Cl.
  *B60W 20/14*    (2016.01)
  *B60W 10/08*    (2006.01)
  *B60K 6/445*    (2007.10)

(52) U.S. Cl.
  CPC ....... *B60Y 2300/89* (2013.01); *Y02T 10/6239* (2013.01); *Y02T 10/7258* (2013.01)

(56) References Cited

U.S. PATENT DOCUMENTS

| | | |
|---|---|---|
| 2002/0091475 A1 | 7/2002 | Hashimoto et al. |
| 2010/0105520 A1* | 4/2010 | Ohbayashi ............ B60W 10/08 477/23 |
| 2010/0174430 A1* | 7/2010 | Irie .................... B60W 10/184 701/22 |
| 2010/0222978 A1* | 9/2010 | Kodama ............... B60W 10/08 701/70 |
| 2010/0270856 A1* | 10/2010 | Maeda .................. B62D 55/14 305/142 |
| 2011/0307132 A1 | 12/2011 | Hashimoto |
| 2012/0158266 A1* | 6/2012 | Miyazaki .............. B60W 10/08 701/70 |
| 2012/0226402 A1* | 9/2012 | Minamiura ........... B60W 10/08 701/22 |
| 2014/0180517 A1* | 6/2014 | Endo .................... B60W 10/08 701/22 |
| 2014/0277892 A1* | 9/2014 | Harada ................ B60W 10/08 701/22 |

\* cited by examiner

VEHICLE CONTROLLER

CROSS REFERENCE TO RELATED APPLICATION

The present application is based on and claims the benefit of priority of Japanese Patent Application No. 2014-082100, filed on Apr. 11, 2014, the disclosure of which is incorporated herein by reference.

TECHNICAL FIELD

The present disclosure generally relates to a vehicle controller for a hybrid vehicle.

BACKGROUND INFORMATION

Generally, a hybrid vehicle has an internal-combustion engine, a first motor-generator, and a second motor-generator that are connected to a drive axle and wheels via a power splitting mechanism. The hybrid vehicle having such a configuration is designated as a split-type hybrid vehicle, or a series-parallel-type hybrid vehicle. A controller for the split-type hybrid vehicle is disclosed in a patent document 1 (i.e., Japanese Patent Laid-Open No. JP-A-2008-49829).

The controller includes a hybrid vehicle (HV) electronic control unit (ECU) that performs a total control of the hybrid vehicle, a motor-generator (MG) ECU for controlling each MG, and a first communication line that connects the HV ECU and the MG ECU in a one-to-one manner.

In addition, the controller for the hybrid vehicle may also be equipped with a second communication line, such as a CAN bus, and a brake ECU. The brake ECU controls a friction brake device and each of the MGs to provide a desired braking force as a sum total of a friction braking force and a regenerative braking force. That is, the brake ECU performs a cooperative control of the friction brake device and the MGs. The second communication line connects the HV ECU and other ECUs, including the brake ECU using two-way communications. That is, other than the brake ECU, an engine ECU is connected with the HV ECU via the second communication line. In the above, "CAN" is a registered trade mark.

The vehicle controller having the above configuration operates distributively and cooperatively. That is, in the conventional hybrid vehicle, the HV ECU calculates a total driving force of the entire vehicle, while calculating a demand torque of each of the MGs. Further, the communication between the HV ECU and the brake ECU via the second communication line enables the cooperative control of the braking force.

The above cooperative control scheme may be more efficiently implemented, if the demand torque of each of the MGs in a normal travel time is calculated in the MG ECU that obtains information about the rotation of each of the MGs. However, the demand torque calculated by the MG ECU may have to be transmitted to the brake ECU via the HV ECU. Therefore, in a transition state of the vehicle travel, which may be experienced when the vehicle travels on a bumpy road such as stone pavement or the like, the cooperative control of the braking force for the drive wheel may diverge, resulting in a series of grips and slips of the drive wheel. Such a divergence of the control may cause an excessive rotation of the first MG, for example, which may exceed a maximum number of rotations of, or example, 10,000 rpm or the like.

SUMMARY

It is an object of the present disclosure to provide a vehicle controller that has an improved controllability of the motor-generator while preventing the divergence of the cooperative control of the braking force in a transition state.

The disclosure of the present document describes a technique devised to achieve the above-described aims. The numerals in the following and in the claims simply exemplify a relationship between the claimed elements and the practical matters in the embodiments, thereby not limiting the scope of the disclosure.

In an aspect of the present disclosure, the vehicle controller controls a hybrid vehicle in which an internal-combustion engine, a first motor generator, and a second motor-generator are connected to a drive axle and a drive wheel via a power splitting mechanism. The vehicle controller includes an HV ECU controlling the hybrid vehicle, an MG ECU controlling a drive of the first motor-generator and the second motor-generator, and a brake ECU controlling a friction brake device, the control of the friction brake device provides a desired amount of braking force which is a sum total of a regenerative braking force from each of the first motor-generator and the second motor-generator and a braking force from the friction brake device. A first communication line connects one-to-one the HV ECU and the MG ECU and a second communication line connects the HV ECU and other ECUs including the brake ECU. The MG ECU calculates a demand torque of the first motor-generator and the second motor-generator based on a total drive power of the vehicle calculated by the HV ECU and communicates with the brake ECU via the second communication line. The MG ECU includes a travel state determiner determining whether a travel state of the hybrid vehicle is (i) a transition state in which the drive wheel alternates between slipping and gripping with a road surface or (ii) a normal state that is other than the transition state, and a communication selector selecting either of the first communication line or the second communication line based on a determination result of the travel state determiner.

In another aspect of the present disclosure, the travel state determiner determines whether the vehicle is in the transition state or in the normal state based on rotation information about at least one of the first motor-generator or the second motor-generator.

In yet another aspect of the present disclosure, the communication selector is a switch disposed on an integrated circuit of the MG ECU.

In still yet another aspect of the present disclosure, the travel state of the hybrid vehicle is the transition state when (i) the rotation information indicates a positive-to-negative or a negative-to-positive change in angular acceleration within a predetermined time period by the first motor-generator, or (ii) the rotation information indicates a negative-to-positive change in angular acceleration within a predetermined time period by the second motor-generator.

By devising the above configuration, the MG ECU calculates the demand torque of each of the first MG and the second MG, which improves the controllability of the first MG and the second MG in comparison to the conventional configuration in which the HV ECU calculates the demand torque of each of the first MG and the second MG.

Further, the MG ECU selects the first communication line in the normal state and selects the second communication line in the transition state (for communications). Therefore, the MG ECU is capable of communicating with the brake ECU in the transition state without a relay of communication by the HV ECU. Thus, the cooperative control of the braking force is prevented from diverging in the transition state.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described based on the drawings.

Reference Design

Before describing an embodiment of the present disclosure, a reference design of the present disclosure is described in details. A vehicle controller in this reference design performs the calculation of the demand torque of each of the motor-generator in an MG ECU. The numerals in the reference design and the numerals in the embodiment of the present disclosure are different in the first digit, that is, when the same component is used in both of the reference design and the present disclosure, the numeral of such component in the reference design has an additional first digit of "1," which may be, for example, 110 versus 10.

Figure 1:
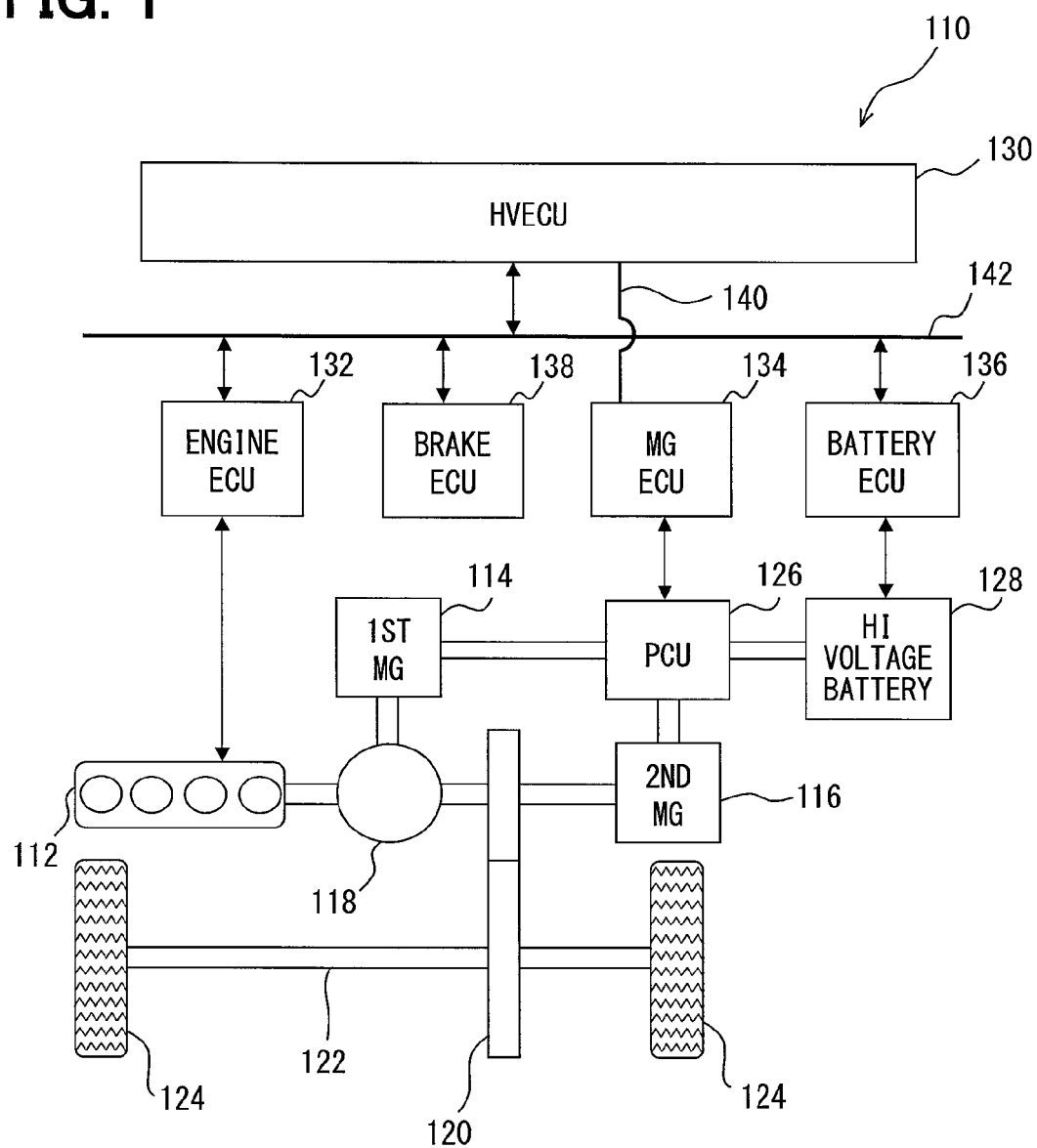
FIG. 1 is a block diagram of a hybrid vehicle which is shown as a reference design of the present disclosure.

First, the outline configuration of a hybrid vehicle is described based on FIG. 1.

As shown in FIG. 1, a hybrid vehicle 110 is provided with an engine 112, which may be an internal-combustion engine, a first motor-generator 114, and a second motor-generator 116. Hereafter, the MG 114 or the first MG 114 indicates the first motor-generator 114. Also, the MG 116 or the second MG 116 indicates the second motor-generator 116. The hybrid vehicle 110 travels on the driving force from at least one of the engine 112, the first MG 114, and the second MG 116, depending on a situation.

The first MG 114 serves as a generator for generating electricity when receiving the driving force, and also serves as a starter when the engine 112 is started. The engine 112 and the first MG 114 and the second MG 116 are connected with each other via a power splitter 118. The power splitter 118 distributes the driving force of the engine 112 to the first MG 114 and to a reduction gear 120, while serving as a power transmission mechanism.

The reduction gear 120 transmits the power generated either in the engine 112, the first MG 114 and/or the second MG 116 to a drive wheel 124 via a drive axle 122, and transmits the driving force from the drive wheel 124 to the first MG 114 and/or the second MG 116.

The hybrid vehicle 110 is further provided with a power control unit 126 and a high voltage battery 128. The high voltage battery 128 is a chargeable and dischargeable direct-current power supply, for example, consisting of rechargeable batteries, e.g. nickel hydride batteries or lithium ion batteries. Hereafter, the PCU 126 may indicate the power control unit 126.

The PCU 126 is connected to the first MG 114, the second MG 116, and the high voltage battery 128. The PCU 126 has an inverter and a booster converter which are not illustrated. The inverter performs a current control, converting between a direct current from the high voltage battery 128 and an alternating current from each of the MGs 114,116.

On the other hand, the booster converter boosts a voltage of the high voltage battery 128 to a high voltage before supplying the voltage to the inverter, and lowers the high voltage of the inverter for charging the high voltage battery 128.

Therefore, the electric power generated by the first MG 114 may be supplied to the second MG 116 via the inverter of the PCU 126, and may be used to charge the high voltage battery 128 via the inverter and the booster converter of the PCU 126. Further, the electric power generated by the MGs 114,116 may be used to charge the high voltage battery 128 via the PCU 126. Furthermore, the electric power charged in the high voltage battery 128 may be supplied to the second MG 116 via the PCU 126.

In addition, the hybrid vehicle 110 is provided with a HV ECU 130, an engine ECU 132 and an MG ECU 134, a battery ECU 136, a brake ECU 138, a first communication line 140, and a second communication line 142. Each of the ECUs 130, 132, 134, 136, 138 is constituted basically from a microcomputer that is provided with CPU, ROM, RAM, a register, etc.

The HV ECU 130 performs a total control of a drive system of the hybrid vehicle 110, managing the engine ECU 132, the MG ECU 134, the battery ECU 136, etc., for the optimized and efficient drive of the vehicle 110. The HV ECU 130 calculates the driving force of the entire vehicle based on the driver's operation (e.g., an accelerator opening), the vehicle speed and the like, and determines how the requested driving force for the engine 112 and the MGs 114, 116 should be distributed among them.

The engine ECU 132 controls the operation state of the engine 112. More practically, for outputting the requested driving force from the engine 112, the ECU 132 controls an opening of a non-illustrated throttle valve to have an appropriate opening degree, and controls a fuel injection amount and an ignition timing of the engine 112.

Via the second communication line 142, the engine ECU 132 is communicably connected to the HV ECU 130, for the control of the drive of the engine 112 according to the control signal from the HV ECU 130. Further, the engine ECU 132 outputs data about the driving state of the engine 112 to the HV ECU 130 as required.

The MG ECU 134 controls each of the MGs 114, 116 according to the state of the hybrid vehicle 110. More practically, by outputting a control signal to the PCU 126, the MG ECU 134 controls each of the MGs 114, 116.

Via the first communication line 140, the MG ECU 134 is communicably connected to the HV ECU 130, for the control of the drive of each of the MGs 114, 116 according to the control signal from the HV ECU 130.

The MG ECU 134 outputs data about the driving state of each of the MGs 114, 116 to the HV ECU 130 as required.

In this reference design, the MG ECU 134 calculates the required demand torque from each of the MGs 114, 116 based on the data of the driving force from the HV ECU 130. Then, based on the calculated demand torque and the detection signals of the non-illustrated sensors, the MG ECU 134 controls the PCU 126.

The battery ECU 136 controls the charge-and-discharge state of the high voltage battery 128 while monitoring the charge state of the high voltage battery 128.

The battery ECU 136 receives a signal required for the management of the high voltage battery 128, e.g., signals regarding the inter-terminal voltage of the high voltage battery 128, charging and discharge currents, battery temperature, etc.

The battery ECU 136 is communicably connected to the HV ECU 130 via the second communication line 142, and the battery ECU 136 outputs the data about the state of the high voltage battery 128 to the HV ECU 130 as required.

The brake ECU 138 controls a friction brake device, for yielding a desired amount of braking force as a sum total of (i) a regenerative braking force from each of the motor-generators and (ii) a braking force from the friction brake device. That is, for generating a target braking force of the hybrid vehicle as the total of the two braking forces, a cooperative control of the braking force is performed by the brake ECU 138.

For example, when the regeneration (of electricity) by each of the MGs 114, 116 is possible, the braking force from the friction brake device is controlled to be matched with a difference between the target braking force of the hybrid vehicle and the regenerative braking force.

If the regeneration is not possible, the braking force by the friction brake device is controlled to be matched with the target braking force of the hybrid vehicle.

The brake ECU 138 is communicably connected to the HV ECU 130 via the second communication line 142.

Figure 2:
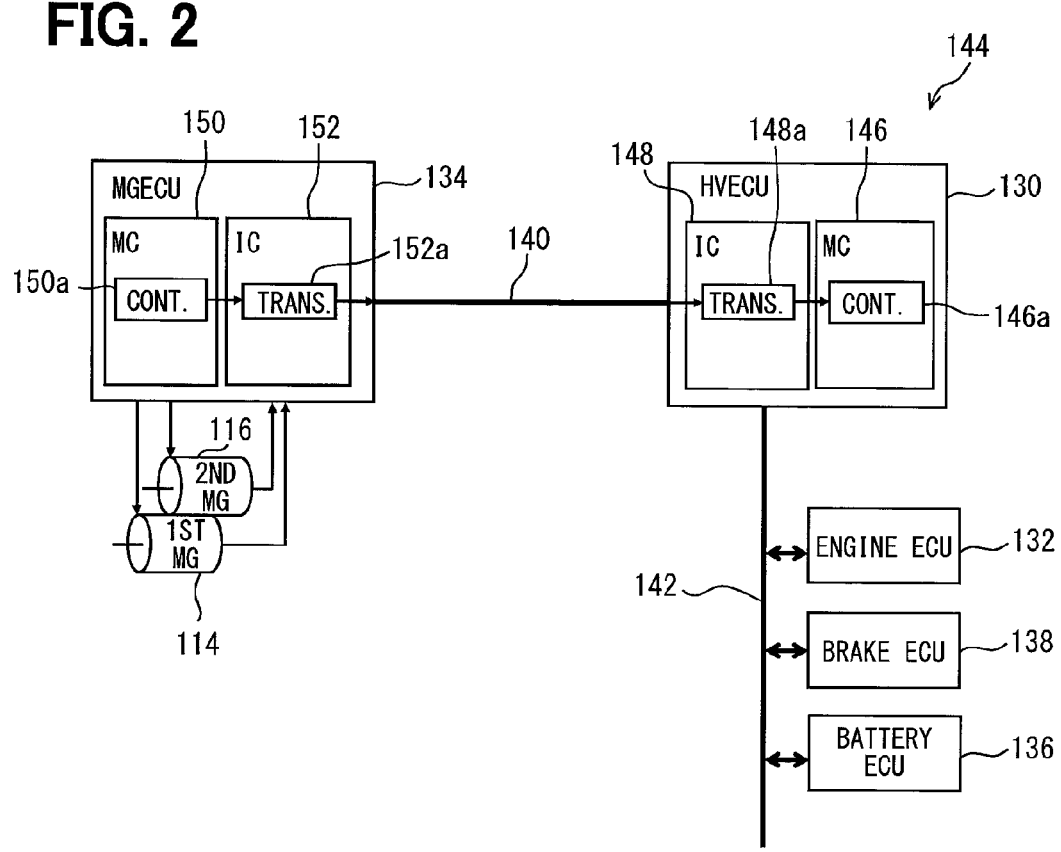
FIG. 2 is a block diagram of a vehicle controller for the hybrid vehicle shown in FIG. 1.

Next, based on FIG. 2, a vehicle controller 144 applied to the above-mentioned hybrid vehicle 110 is described.

As shown in FIG. 2, the vehicle controller 144 is provided with ECUs, i.e., the ECUs 132, 136, 138, in addition to the HV ECU 130, the MG ECU 134, and the brake ECU 138, together with the first communication line 140 and the second communication line 142.

The first communication line 140 connects the HV ECU 130 and the MG ECU 134 in a one-to-one manner. The HV ECU 130 and the MG ECU 134 are mutually-communicable (i.e., are in two-way communication) via this first communication line 140. The MG ECU 134 is communicable only with the HV ECU 130.

In this reference design, the first communication line 140 is implemented as a CAN bus. "CAN (Controller Area Network)" is a registered trademark. The HV ECU 130 has a microcomputer 146 and an IC 148. The microcomputer 146 has a controller 146a for CAN, and the IC 148 has a transceiver 148a for CAN.

On the other hand, the MG ECU 134 has a microcomputer 150 and an IC 152. The microcomputer 150 has a controller 150a for CAN, and the IC 152 has a transceiver 152a for CAN. Thus, in the MG ECU 134, the controller 150a and the transceiver 152a are provided in a one-to-one manner.

The second communication line 142 establishes connection among the HV ECU 130 and other ECUs including the brake ECU 138. In this reference design, the second communication line 142 establishes a mutually-communicable connection among the HV ECU 130, the engine ECU 132, the battery ECU 136, and the brake ECU 138. Further, the second communication line 142 is implemented as a CAN bus.

As described above, in this the vehicle controller 144, the MG ECU 134 calculates the demand torque of each of the MGs 114, 116. Thus, because the MG ECU 134, to which the data about a driving state is inputted from each of the MGs 114, 116, is used to calculate the demand torque of each of the MGs 114, 116, the controllability of each of the MGs 114, 116 is higher in comparison to a configuration which calculates the demand torque of each of the MGs by the HV ECU.

On the other hand, in terms of the cooperative control of the braking forces, among the regenerative braking force from each of the MGs 114, 116 and the braking force from the friction brake device, the demand torque of each of the MGs 114, 116 calculated in the MG ECU 134 must be first transmitted to the HV ECU 130 via the first communication line 140, and, subsequently must be transmitted to the brake ECU 138 via the second communication line 142.

Thus, the controllability of the cooperative control of the braking forces is lowered due to a relaying of the control by the HV ECU 130.

Next, based on FIGS. 3 to 8, a problem due to the lowered controllability of the cooperative control of the braking force is described.

Figure 3:
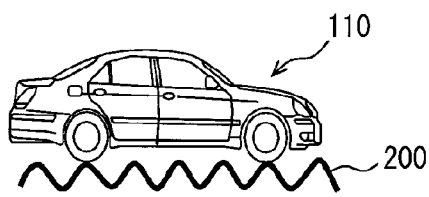
FIG. 3 is an illustration of the hybrid vehicle traveling on a bumpy road.

As shown in FIG. 3, when the hybrid vehicle 110 having the above-described vehicle controller 144 travels a bumpy road 200, such as stone pavement, the drive wheel 124 grips and slips alternatingly, i.e., is driven in a transition state.

Figure 4A:
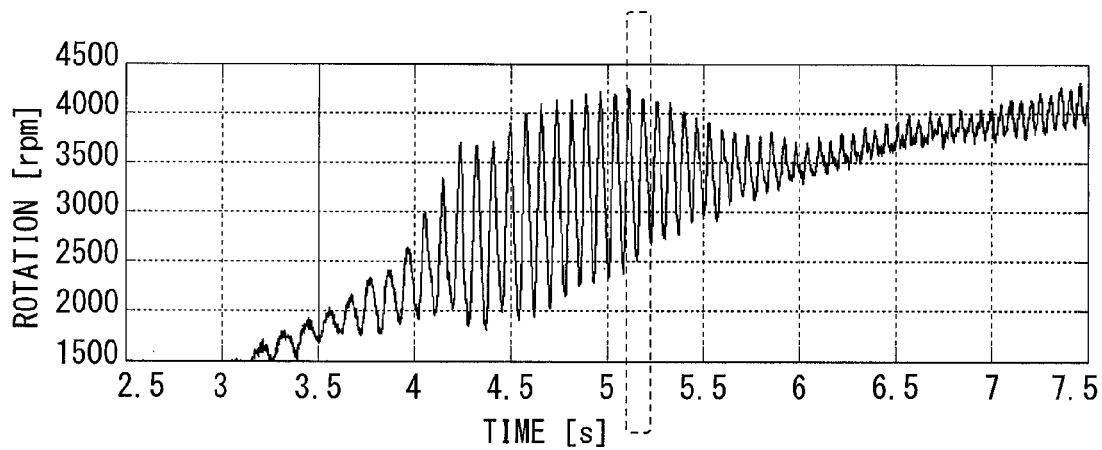
FIG. 4A is a graph illustrating a transition state of engine/MG rotations.
Figure 4B:
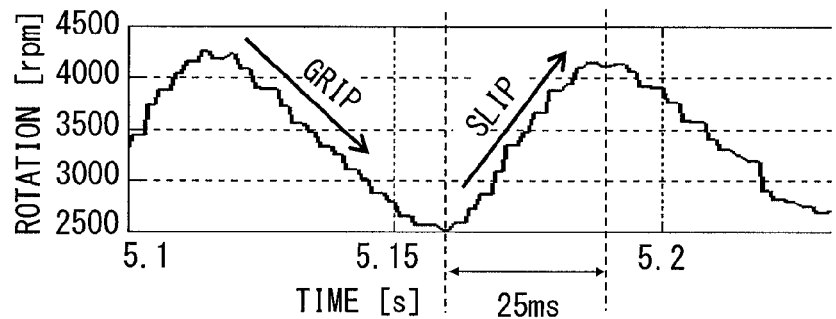
FIG. 4B is a graph illustrating a transition state of engine/MG rotations.

As shown in FIGS. 4A/B, at the time of a grip, the number of rotations of the drive wheel 124 falls due to friction between the wheel 124 and a road surface, and the number of rotations rises at the time of a slip because the drive wheel 124 spins. In the transition state, the rise and the fall of the number of rotations are repeated periodically. In FIGS. 4A/B, the slip and the grip alternate at a cycle of 25 [ms] at a predetermined vehicle speed.

Figure 5:
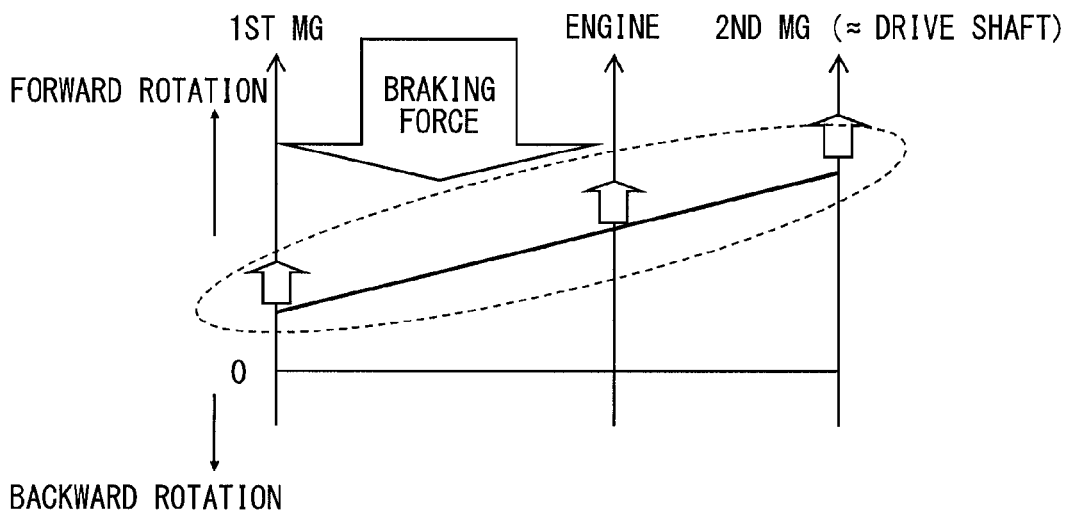
FIG. 5 is a collinear diagram of the engine/MG rotations at an immediately-after slip timing, indicating a desirable cooperative control of the torque and the braking force for the first motor-generator.
Figure 6:
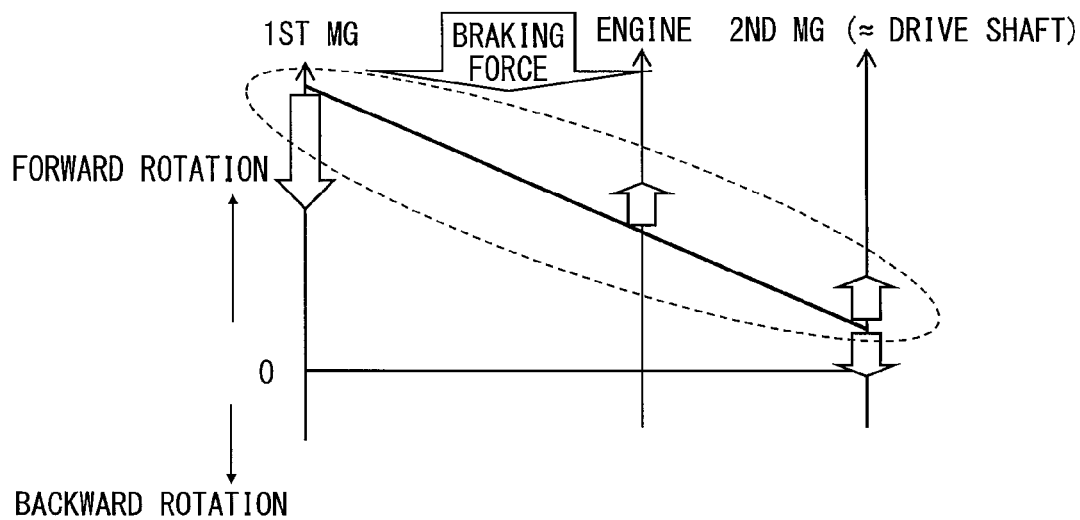
FIG. 6 is a collinear diagram of the engine/MG rotations at an immediately-after grip timing, indicating another desirable cooperative control of the torque and the braking force for the first motor-generator.

FIGS. 5 and 6 respectively show a state of desirable cooperative control, i.e., what the cooperative control should essentially be. FIG. 5 shows the collinear diagram at the moment of slipping, that is, immediately after shifting from a grip to a slip. FIG. 6 shows the collinear diagram at the moment of gripping, that is, immediately after shifting from a slip to a grip.

When slipping, friction with a road surface will be lost and the drive wheel 124 (i.e., the drive axle 122) spins. Thereby, as shown in FIG. 5, the number of rotations of the second MG 116 rises steeply. At such moment, the number of rotations of the first MG 114 falls, because the engine 112 serves as a "fulcrum."

Since the MG ECU 134 performs (i.e., continues) the same control as a grip state to each of the MGs 114, 116 at the moment of slipping, the demand torque from each of the MGs 114, 116 is a positive torque. That is, (in this reference design,) while the desirable torque is a negative torque at the moment of slipping, i.e., the regenerative braking is desirably performed at such moment, such a control cannot be performed/realized.

Due to the positive torque from each of the MGs 114, 116 at the moment of slipping, the brake ECU 138 controls the friction brake device to produce a big braking force (i.e., a brake operation force), which may be illustratively described as a suppressive force all over the oval area drawn with a broken line in FIG. 5, for the stabilization of a vehicle behavior.

That is, for the priority of stabilization of the vehicle behavior, the friction brake device should be controlled to produce a big braking force in the desirable cooperative control, since the first MG 114 (inevitably) produces a positive torque at the moment of slipping, which desirably should be suppressed.

On the other hand, when shifting from a slip to a grip as shown in FIG. 6, the number of rotations of the drive axle 122, i.e., the second MG 116, steeply falls by friction between the drive wheel 124 and the road surface. At such moment, the number of rotations of the first MG 114 steeply rises, because the engine 112 serves as a "fulcrum."

At the moment of gripping, the MG ECU 134 controls the first MG 114, preventing the number of rotations of the first MG 114 from exceeding the upper limit of the number of rotations set up in advance (e.g., 10,000 rpm). Therefore, the first MG 114 produces a big negative torque, i.e., produces a big regenerative braking force.

Based on a forward rotation of the first MG 114 and it is producing a big negative torque, a negative torque (i.e., a regenerative braking force) is produced also in the second MG 116 due to the gear ratio of a rotating element of the power splitter 118.

That is, at the moment of gripping, the brake ECU 138 should desirably control the friction brake device to produce a smaller braking force in comparison to the braking force at the moment of slipping in the desirable cooperative control, since the first MG 114 produces a strong regenerative braking force and the second MG 116 also produces a regenerative braking force at such moment.

In other words, the desirable cooperative control at the moment of gripping is to produce a big negative torque from the first MG 114, while producing a small braking force from the friction brake device.

However, in the cooperative control of the braking force by the vehicle controller 144 of this reference design, the demand torque of each of the MGs 114, 116 which is calculated by the MG ECU 134 must first be transmitted to the HV ECU 130 via the first communication line 140, and, subsequently, must be transmitted to the brake ECU 138 via the second communication line 142.

In general, the transmission cycle of the CAN bus, which serves as the first communication line 140 and as the second communication line 142, is 8 [ms] or the like, respectively. Further, the calculation cycle of the HV ECU 130 is also 8 [ms] or the like. Therefore, it takes about 24 [ms] to transmit the data about the demand torque from the MG ECU 134 to the brake ECU 138. This value, 24 [ms], is substantially equal to the cycle of 25 [ms] of the above-mentioned transition state.

Now, even by performing an interruption process to reduce the calculation cycle of the HV ECU 130 down to 1 [ms] or the like, the data transmission cycle to transmit the data about the demand torque still take about 17 [ms]. Therefore, regardless of performing the interruption process, the cycle of the transition state cannot be slash down by half, i.e., to a value below 12.5 [ms]. Therefore, the divergence of the (cooperative) control emerges in actuality as shown below.

Figure 7:
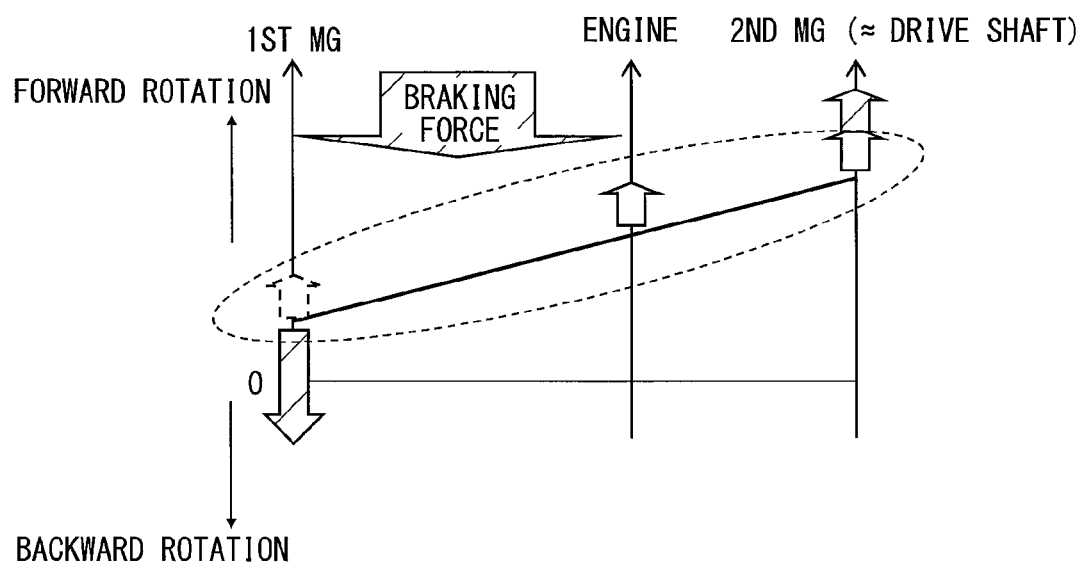
FIG. 7 is a collinear diagram of the engine/MG rotations at an immediately-after slip timing, indicating an actual cooperative control of the torque and the braking force for the first motor-generator.
Figure 8:
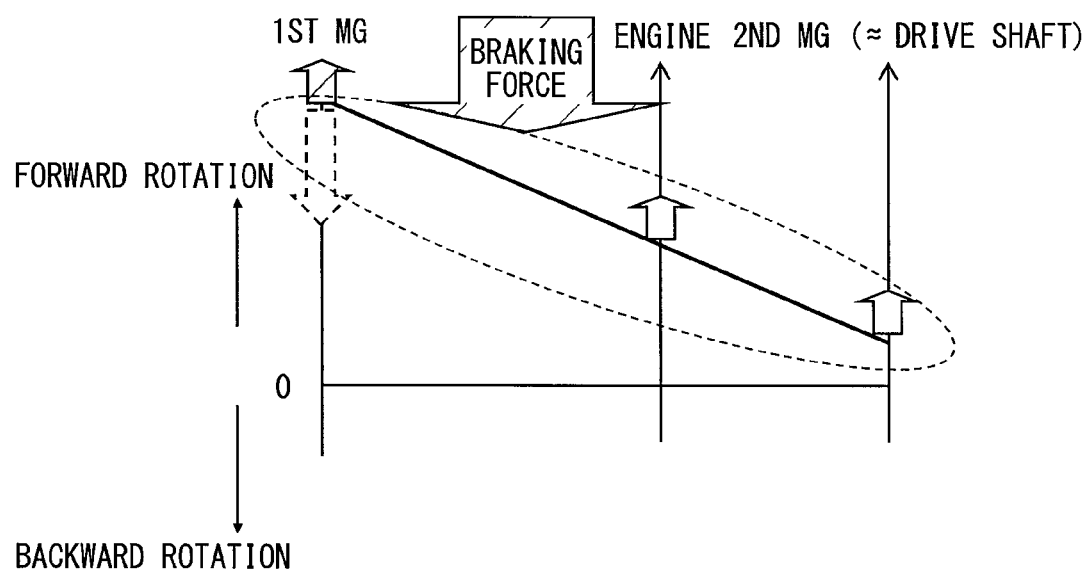
FIG. 8 is a collinear diagram of the engine/MG rotations at an immediately-after grip timing, indicating an actual cooperative control of the torque and the braking force for the first motor-generator.

FIGS. 7 and 8 show a state of divergent control, among which FIG. 7 shows a collinear diagram at the moment of slipping, and FIG. 8 shows a collinear diagram at the moment of gripping. In FIGS. 7 and 8, a torque from the divergent control is shown by a hatched arrow, and a torque which should desirably be produced in the first MG 114 is shown by a broken-line arrow.

When the cycle of the transition state and the data transmission cycle from the MG ECU 134 to the brake ECU 138 substantially match, the control for the grip state is performed in the slip state and the control for the slip state is performed in the grip state.

For example, at the moment of slipping, the first MG 114 actually produces a big negative torque as shown in FIG. 7. In other words, the negative torque which should (desirably) be produced at the moment of gripping is actually produced at the moment of slipping.

Further, when the first MG 114 is controlled to rotate backward with a negative torque produced therein, such a situation produces a, positive torque (i.e., a forward-thrusting power) in the second MG 116. Further, the friction brake device produces a small braking force. Therefore, the vehicle behavior becomes unstable.

On the other hand, the first MG 114 actually produces a positive torque at the moment of gripping as shown in FIG. 8, for controlling the number of rotations of the first MG 114 not to exceed the upper limit, even though, at such a moment, the first MG 114 should produce a big negative torque. Therefore, the number of rotations of the first MG 114 exceeds the upper limit. In addition, although the braking force by the friction brake device should be weakened, it actually is strengthened to a big braking force, which serves as a stopping force for the vehicle.

First Embodiment

Figure 9:
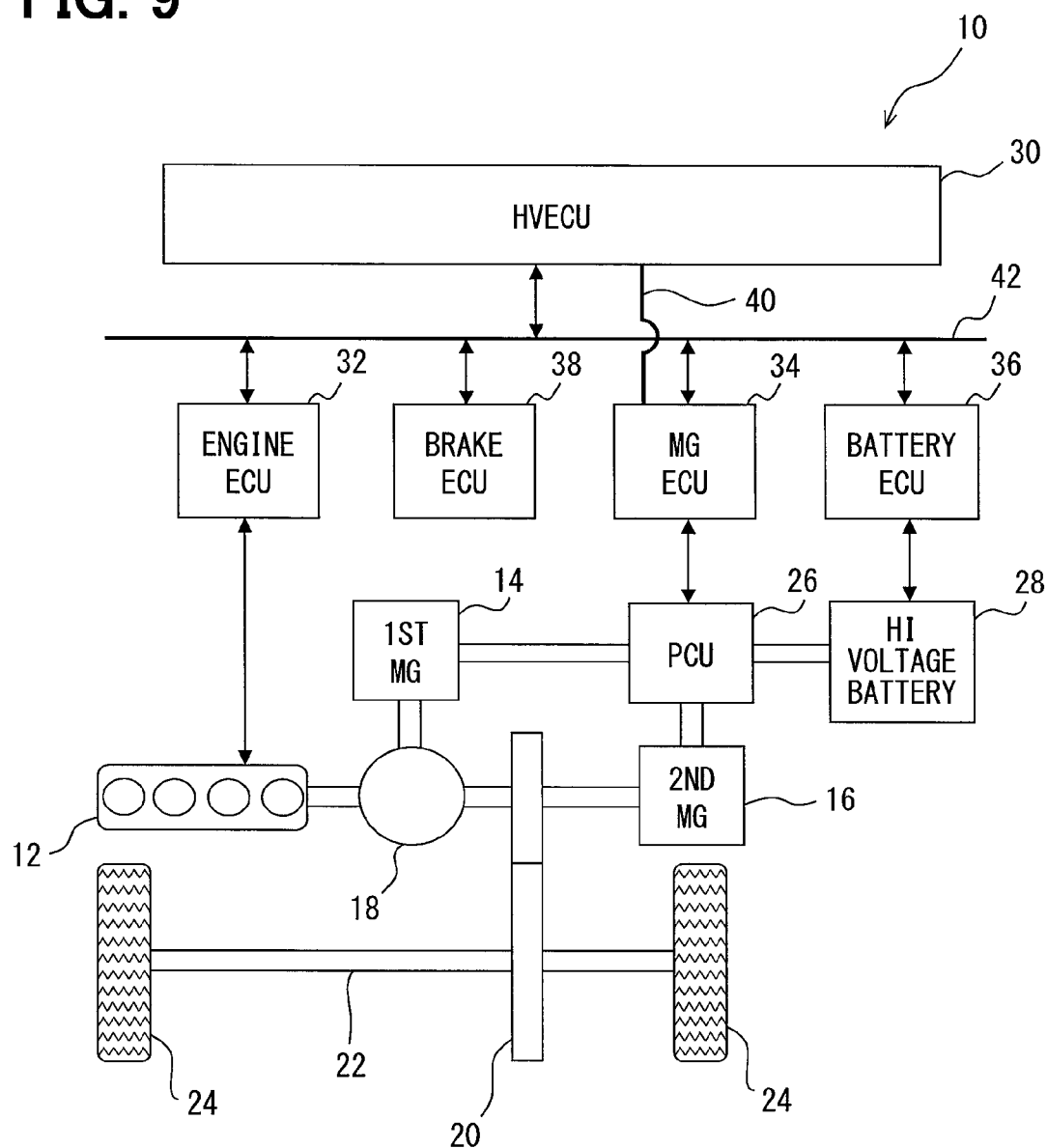
FIG. 9 is a block diagram of the hybrid vehicle in a first embodiment of the present disclosure.

First, the outline configuration (i.e., a block diagram) of a hybrid vehicle is described based on FIG. 9. The configuration of a hybrid vehicle 10 shown in FIG. 9 is almost same as the hybrid vehicle 110 shown in the reference design. The hybrid vehicle 10 is provided with an engine 12 and a first MG 14, a second MG 16, a power splitter 18, a speed reduction gear 20, a drive axle 22, and a drive wheel 24. In addition, the hybrid vehicle 10 has an HV ECU 30, an engine ECU 32, an MG ECU 34, a battery ECU 36, a brake ECU 38, a first communication line 40, and a second communication line 42.

A difference between the reference design and the first embodiment is that, in the first embodiment, the first communication line 40 enabling the mutual communication between the MG ECU 34 and the HV ECU 30 is supplemented by the second communication line that enables the mutual communication between the MG ECU 34 and the brake ECU 38.

Figure 10:
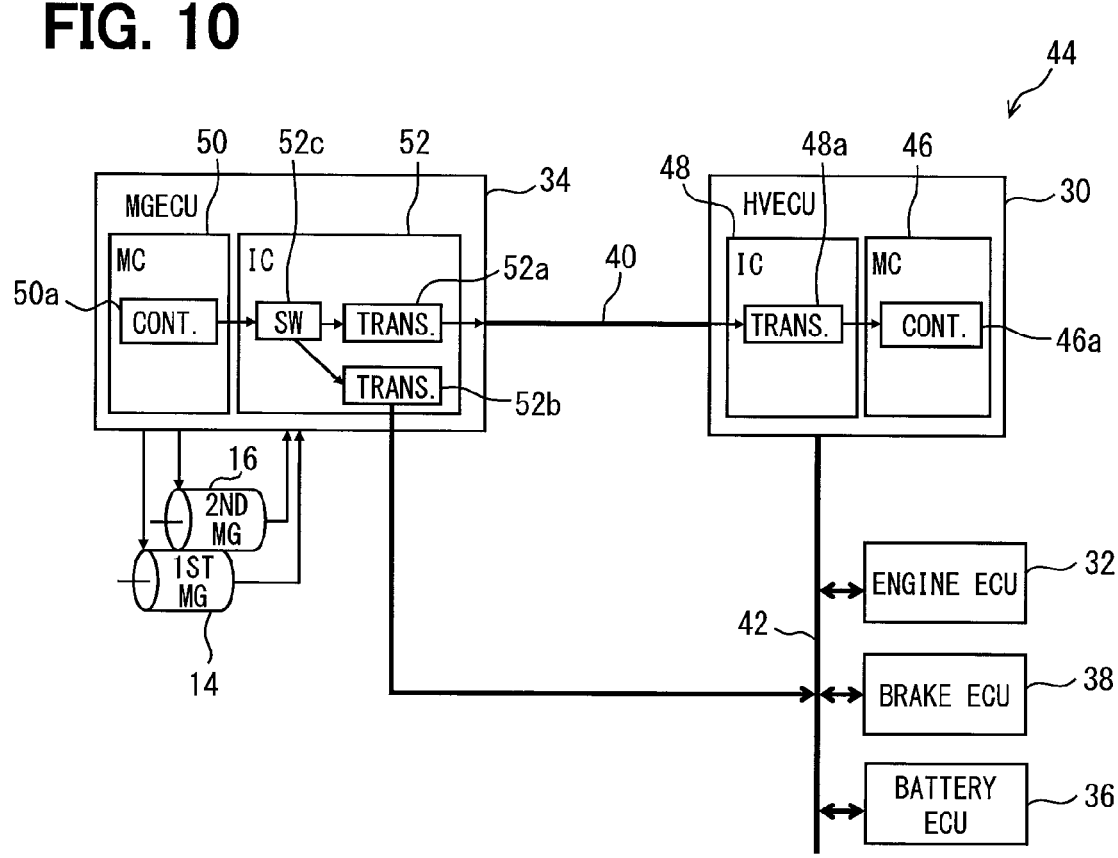
FIG. 10 is the vehicle controller for the hybrid vehicle shown in FIG. 9.

Next, based on FIG. 10, a vehicle controller 44 applied to the above-mentioned hybrid vehicle 10 is described.

As shown in FIG. 10, the vehicle controller 44 is provided with the ECUs, i.e., the HV ECU 30 and the MG ECU 34, together with other ECUs 32, 36, and 38, as well as the first communication line 40, and the second communication line 42 just like the vehicle controller 144 shown in the reference design.

The first communication line 40 connects the HV ECU 30 and the MG ECU 34 in a one-to-one manner. That is, the first communication line 40 only connects the HV ECU 30 with the MG ECU 34. Put another way, the first communication line 40 is a dedicated communication line between the HV ECU 30 with the MG ECU 34. The HV ECU 30 and the MG ECU 34 perform two-way (i.e., mutual) communication via the first communication line 40. The first communication line 40 in the present embodiment is implemented as a CAN bus.

The second communication line 42 connects the HV ECU 30 and plural ECUs including the brake ECU 38. Further, two-way communication among those ECUs is enabled via the second communication line 42, i.e., among the HV ECU 30, the engine ECU 32, the battery ECU 36, and the brake ECU 38. The second communication line 42 is implemented as a CAN bus.

In addition, in the present embodiment, the MG ECU 34 can communicate via the second communication line 42 (with other ECUs). That is, the MG ECU 34 can perform two-way communication with the brake ECU 38, without using the first communication line 40 and the HV ECU 30.

The HV ECU 30 has a microcomputer 46 and an IC 48, just like the HV ECU 130 shown in the reference design. The microcomputer 46 has a controller 46a for CAN, and an IC 48 has a transceiver 48a for CAN.

The MG ECU 34 has, just like the MG ECU 134 shown in the reference design, a microcomputer 50 and an IC 52. The microcomputer 50 has a controller 50a for CAN. However, the microcomputer 50 (i.e., the controller 50a) of the present embodiment is further equipped with a determination function which determines whether the hybrid vehicle 10 is in the transition state. Therefore, the microcomputer 50 (i.e., the controller 50a) is equivalent to a travel state determiner in the claims.

Unlike the IC 152 of the reference design, the IC 52 has two transceivers 52a and 52b for CAN, and a communication selector 52c which switches the transceivers 52a and 52b according to the travel state of the hybrid vehicle 10. The switch 52c is equivalent to a communication selector in the claims. The transceiver 52a handles communication via the first communication line 40, and transceiver 52b handles communication via the second communication line 42.

As described above, the data about the driving state of the MGs 14, 16 is inputted to the MG ECU 34. For example, the data about the inter-terminal voltage between the terminals of a high voltage battery 28 is inputted from a voltage sensor which is not illustrated. The data about the actual electric current value which flows into the armature coil of the MGs 14, 16 is inputted from a current sensor which is also not illustrated. The data about the rotation position (i.e., a rotor angle θ) of the MGs 14, 16 is inputted from a rotation sensor such as a resolver which is also not illustrated.

The HV ECU 30 calculates the driving force for the hybrid vehicle 10 based on a driver's operation (e.g., an accelerator opening), a vehicle speed, etc., and determines how to distribute the required driving force among the engine 12 and the MGs 14, 16 according to the travel state of the hybrid vehicle 10.

The MG ECU 34 calculates the demand torque required from the MGs 14, 16 based on the driving force data from the HV ECU 30. Further, a PCU 26 is controlled based on the calculated demand torque and the detection signal of the voltage sensor, the current sensor, the rotation sensor, etc. mentioned above (e.g., Proportional Integral (PI)).

Further, the controller 50a of the MG ECU 34 determines whether the travel state of the hybrid vehicle 10 is the transition state, which is an alternation of a grip and a slip (i.e., alternating between a gripping state and a slipping state), or the normal state, which is a state other than the transition state. Based on the determined result by the controller 50a, the communication selector 52c selects one of the transceivers 52a and 52b. Then, the MG ECU 34 communicates via one of the communication lines 40 and 42 corresponding to the selected one of the two transceivers 52a and 52b.

Figure 11:
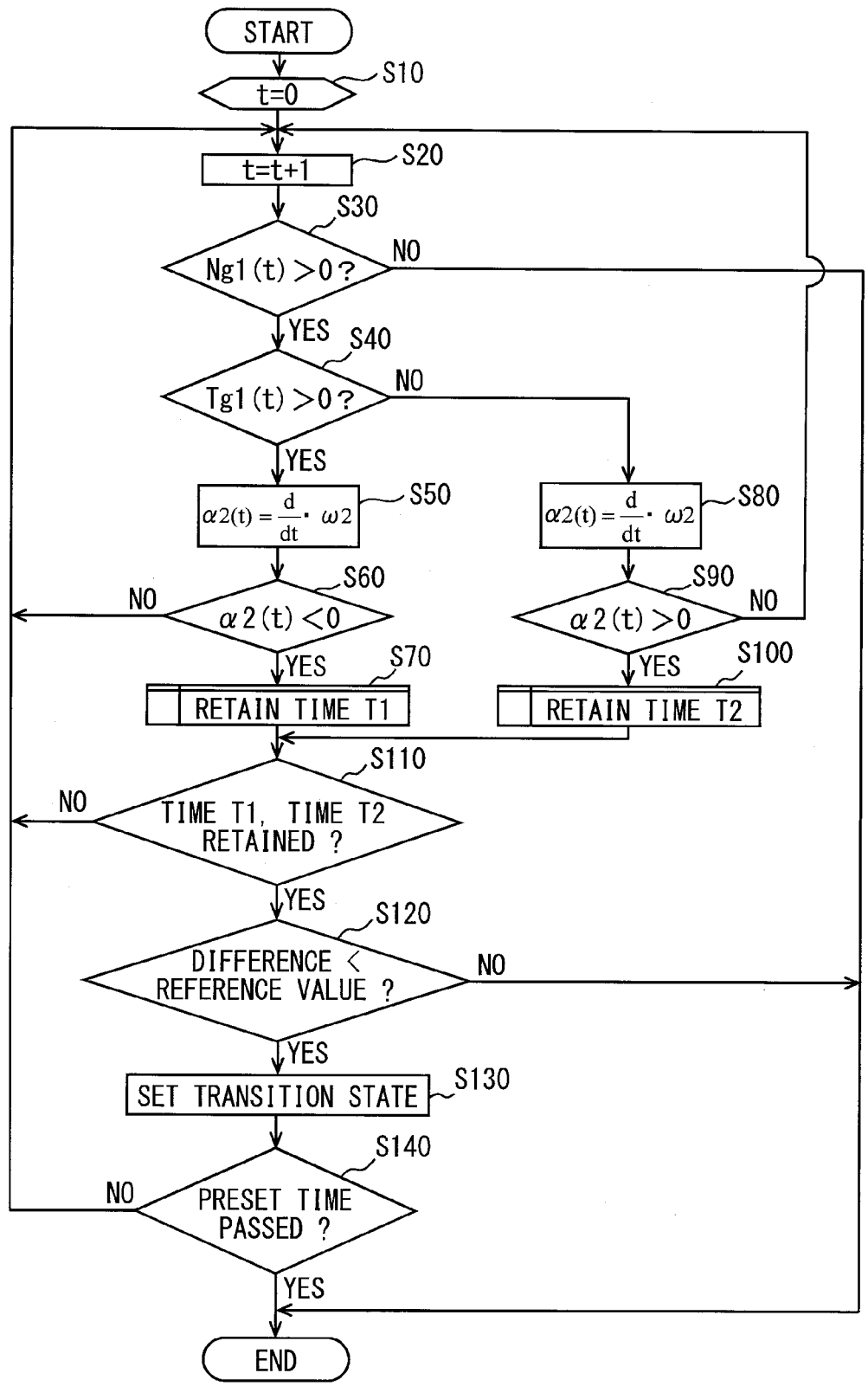
FIG. 11 is a flowchart of a control process for switching between two communication lines by an MG ECU.

Next, based on FIG. 11, a switch process for switching communication conditions by the microcomputer 50 of the MG ECU 34 is described. The MG ECU 34 perform the process shown below, when a power supply for the ECUs is switched ON. While the power supply is switched ON, the process is repeatedly executed.

The microcomputer 50 sets t=0 as an initial value of a counter first, when the power supply is switched ON (Step S10). Further, conditions for normal operations are also set up. The controller 50a of the microcomputer 50 outputs an instruction signal for setting the conditions for the normal operations to the communication selector 52c of the IC 52. Thereby, the communication selector 52c selects the transceiver 52a for communication, and communication between the MG ECU 34 and the HV ECU 30 is enabled via the first communication line 40.

Subsequently, the microcomputer 50 sets t=t+1 (Step S20). Then, while the microcomputer 50 calculates the number of rotations Ng1(t) of the first MG 14 based on the detection signal of the rotation sensor, it is determined whether the number of rotations Ng1(t) is a positive number (Step S30).

When the number of rotations Ng1(t) is not a positive number, i.e., when the first MG 14 is in a backward rotation, the process is finished. On the other hand, when the number of rotations Ng1(t) is a positive number, i.e., when the first MG 14 in a forward rotation, the microcomputer 50 then determines whether the calculated demand torque Tg1(t) is a positive value (Step S40).

When it is determined that the demand torque Tg1(t) is a positive value in Step S40, the microcomputer 50 calculates an angular acceleration α2(t) based on the rotor angle θ of the second MG 16 (Step S50). Further, ω2 represents an angular velocity of the second MG 16, and the angular acceleration α2(t) is a differentiation of ω2, namely, is derived by differentiating the rotor angle θ of the second MG 16 twice.

Subsequently, the microcomputer 50 determines whether the angular acceleration α2(t) obtained in Step S50 is a negative value (Step S60). In Step S60, it is determined, in other words, whether a sudden change from a positive value to a negative value has happened regarding the angular acceleration α2(t). That is, whether a slip-to-grip change has been caused is determined.

When the angular acceleration α2(t) is a negative value, i.e., when it is determined that a slip has changed to a grip, the microcomputer 50 retains (e.g., stores in an internal memory) a current time T1 (Step S70).

On the other hand, when it is determined that α2(t) is not a negative value, the process returns to Step S20 and the above process is repeated.

In Step S40, when the demand torque Tg1(t) is not a positive value, i.e., when it is determined that Tg1(t) is a negative value, the microcomputer 50 calculates the angular acceleration α2(t) based on the rotor angle θ of the second MG 16 (Step S80). Subsequently, the microcomputer 50 determines whether the angular acceleration α2(t) obtained in Step S80 is a positive value (Step S90).

In Step S80, it is determined, in other words, whether a sudden change from a negative value to a positive value has happened regarding the angular acceleration α2(t). That is, whether a grip-to-slip change has been caused is determined.

When the angular acceleration α2(t) is a positive value, i.e., when it is determined that a grip has changed to a slip, the microcomputer 50 retains (e.g., stores in an internal memory) a current time T2 (Step S100).

On the other hand, when it is determined that α2(t) is not a positive value, the process returns to Step S20 and the above process is repeated.

After performing a process of Step S70 and a process of S100, the microcomputer 50 determines whether both of the time T1 and the time T2 are stored in an internal memory, i.e., whether both of the time T1 and the time T2 are retained (Step S110).

When it is determined that not both of the time T1 and the time T2 are retained, the process returns to Step S20, and the above process is repeated.

On the other hand, when it is determined that both of the time T1 and the time T2 are retained, the microcomputer 50 (i.e., the controller 50*a*) determines whether an absolute value of difference between the time T1 and the time T2 is less than a reference value set up in advance (Step S120). In the present embodiment, 25 [ms] which is a cycle of the transition state is set up as a reference value. The reference value is equivalent to a predetermined time period in the claims.

In Step S120, when the difference is less than a reference value, i.e., when it is determined that the hybrid vehicle 10 is in the transition state, the controller 50*a* of the microcomputer 50 outputs an instruction signal for setting the communication selector 52*c* of the IC 52 to the transition state. That is, the controller 50*a* sets the transition state (Step S130).

According to the above, the communication selector 52*c* selects the transceiver 52*b* for communication, and communication between the MG ECU 34 and the brake ECU 38 is enabled via the second communication line 42.

Therefore, the MG ECU 34 can transmit the data of the demand torque to the brake ECU 38 via the second communication line 42. The data of the demand torque has a high priority in the communication frame, and is processed in a prioritized manner. Further, a time of switching from the normal state to the transition state is stored in the internal memory.

On the other hand, in Step S120, when the difference is not less than a reference value, i.e., when it is determined that the hybrid vehicle 10 is in the normal state, the process is finished.

Subsequently, the microcomputer 50 determines whether a preset lapse time has passed from the setting (i.e., a set timing) of the transition state (Step S140). As a preset lapse time, 1 [s] is set up, for example. When it is determined that the performed lapse time has passed, the process is finished. In case that the power supply is (still) switched ON, the process is repeated from Step S10. On the other hand, when it is determined that the preset lapse time has not passed, the process returns to Step S20, and the above process is repeated.

Next, the effects of the vehicle controller 44 concerning the present embodiment are described.

The vehicle controller 44 of the present embodiment uses the MG ECU 34 to calculate the demand torque of the MGs 14, 16. Thus, the demand torque calculation in the MG ECU 34 to which the rotation position (i.e., the rotor angle θ) of the MGs 14, 16 is inputted improves the controllability of each of the MGs 14, 16, in comparison to the demand torque calculation of the reference design which calculates the demand torque of the MG in HV ECU.

The MG ECU 34 selects the first communication line 40 in the normal state, and selects the second communication line 42 in the transition state. Therefore, the MG ECU 34 can communicate with the brake ECU 38 in the transition state, without passing the communication data to the HV ECU 30.

Therefore, the deterioration of controllability of the cooperative control of the braking force which is shown in the above by the reference design is prevented. That is, the divergence of the cooperative control of the braking force in the transition state is prevented. Thereby, the excessive number of rotations of the first MG 14 exceeding the upper limit is prevented.

Further, the control cycle of the MGs 14, 16 by the MG ECU 34 is in an order of 100 [μs] or the like, for example. Thus, in case that the MG ECU 34 and the brake ECU 38 are always put in a communicable state via the second communication line 42, the communication among other ECUs other than the MG ECU 34, i.e., communication among the ECUs 30, 32, 36, 38 cannot be performed.

On the other hand, the communication between the MG ECU 34 and the brake ECU 38 via the second communication line 42 in the present embodiment is performed only in the transition state, the influence of such communication between the MG ECU 34 and the brake ECU 38 over the communication among other ECUs 30, 32, 36, 38 is prevented as much as possible.

The cycle of the software calculation in the normal state by the MG ECU 34 is about 2.5 [ms] or the like. Therefore, in case that both of the first communication line 40 and the second communication line 42 are always put in the communicable state, the microcomputer 50 must performs two processes, i.e., a process of the software calculation in the normal state and a process of 100 [μs] control cycle. In such case, a process of the software calculation in the normal state may be interfered with other process. In order to prevent such interference, the microcomputer 50 having a high performance microprocessor has to be used.

On the other hand, the control scheme of the present embodiment is performable by the normal, inexpensive microprocessor, since the communication lines 40, 42 are switched in the normal state and in the transition state. That is, the microcomputer 50 may be a generic one.

In the present embodiment, the controller 50*a* of the microcomputer 50 determines whether the vehicle is in the transition state or not based on the rotation information of the MGs 14, 16. Therefore, the above-mentioned effects are achieved with a simple configuration.

The determination regarding the transition state may be performed based on information other than the rotation information of the MGs 14, 16, e.g., the detection signals from an acceleration sensor, a wheel speed sensor, etc. which may be used to detect a sideslip of the hybrid vehicle 10.

However, the above determination may more preferably be performed by using the rotation information of the MGs 14, 16 which are controlled by the MG ECU 34. That is, the determination performed in the above-described manner according to the present embodiment achieves a simple configuration of the system while improving the controllability.

Further, in the present embodiment, the communication selector 52*c* of the IC 52 is adopted as a communication selector, for selecting communication via the first communication line 40 in the normal state and selecting communication via the second communication line 42 in the transition state. Thus, the communication selector is realized as hardware in an IC.

Therefore, in comparison to an implementation of the communication selector as software of the microcomputer 50, the responsiveness of the control in response to the slip-grip situation, or the controllability of such situation, is improved.

However, the software of the microcomputer 50 may also be usable for implementing a communication selector. In such case, the communication selector 52c of the IC 52 is dispensable, thereby a simpler configuration of the MG ECU 34 is achieved.

In the flowchart shown in FIG. 11, based on the angular acceleration $\alpha2(t)$ of the second MG 16, the microcomputer 50 detects a slip-grip change timing and a grip-slip change timing for the determination of the transition state.

However, those change timings may also be detectable based on the angular acceleration $\alpha1(t)$ of the first MG 14.

However, the determination based on the angular acceleration $\alpha2(t)$ of the second MG 16 may be more preferable, since the number of rotations of the second MG 16 is substantially equal to the number of rotations of the drive axle 22.

Although the present disclosure has been fully described in connection with preferred embodiment thereof with reference to the accompanying drawings, it is to be noted that various changes and modifications will become apparent to those skilled in the art.

For example, the use of the CAN bus as the first communication line 40 in the present embodiment may be changed to a different configuration. That is, communication between the HV ECU 30 and the MG ECU 34 is not necessarily limited to a CAN protocol.

Such changes, modifications, and summarized schemes are to be understood as being within the scope of the present disclosure as defined by appended claims.

What is claimed is:

1. A vehicle controller for controlling a hybrid vehicle in which an internal-combustion engine, a first motor-generator, and a second motor-generator are connected to a drive axle and a drive wheel via a power splitting mechanism, the vehicle controller comprising:
   a hybrid vehicle (HV) electronic control unit (ECU) controlling the hybrid vehicle;
   a motor generator (MG) ECU controlling a drive of the first motor-generator and the second motor-generator;
   a brake ECU controlling a friction brake device, the control of the friction brake device provides a desired amount of braking force which is a sum total of a regenerative braking force from each of the first motor-generator and the second motor-generator and a braking force from the friction brake device;
   a first communication line connecting one-to-one the HV ECU and the MG ECU; and
   a second communication line connecting the HV ECU and other ECUs including the brake ECU and the MG ECU, wherein
   the MG ECU calculates a demand torque of the first motor-generator and the second motor-generator based on a total drive power of the vehicle calculated by the HV ECU,
   the MG ECU communicates with the brake ECU via the second communication line, and
   the MG ECU includes:
      a microcomputer determining whether a travel state of the hybrid vehicle is (i) a transition state in which the drive wheel alternates between slipping and gripping with a road surface or (ii) a normal state that is other than the transition state; and
      a switch selecting either of the first communication line or the second communication line based on a determination result of the travel state determiner.

2. The vehicle controller of claim 1, wherein
the travel state determiner determines whether the vehicle is in the transition state or in the normal state based on rotation information about at least one of the first motor-generator or the second motor-generator.

3. The vehicle controller of claim 2, wherein
the travel state of the hybrid vehicle is the transition state when
(i) the rotation information indicates a positive-to-negative or a negative-to-positive change in angular acceleration within a predetermined time period by the first motor-generator, or
(ii) the rotation information indicates a negative-to-positive change in angular acceleration within a predetermined time period by the second motor-generator.

4. The vehicle controller of claim 1, wherein
the communication selector is a switch disposed on an integrated circuit of the MG ECU.

* * * * *